(12) United States Patent
Kokeguchi et al.

(10) Patent No.: US 7,568,726 B2
(45) Date of Patent: Aug. 4, 2009

(54) AIR BELT APPARATUS

(75) Inventors: Akira Kokeguchi, Tokyo (JP); Atsushi Hiroshige, Toyota (JP); Katsumi Kato, Toyota (JP)

(73) Assignee: Takata Corporation, Tokyo (JP)

( * ) Notice: Subject to any disclaimer, the term of this patent is extended or adjusted under 35 U.S.C. 154(b) by 326 days.

(21) Appl. No.: 11/526,008

(22) Filed: Sep. 25, 2006

(65) Prior Publication Data

US 2007/0069509 A1   Mar. 29, 2007

(30) Foreign Application Priority Data

Sep. 26, 2005   (JP) ............................. 2005-278163

(51) Int. Cl.
 *B60R 21/018* (2006.01)
(52) U.S. Cl. .................................. 280/733; 280/801.1
(58) Field of Classification Search ................. 280/733, 280/801.1, 805
 See application file for complete search history.

(56) References Cited

U.S. PATENT DOCUMENTS 5,445,411 A * 8/1995 Kamiyama et al. .......... 280/733
6,082,763 A * 7/2000 Kokeguchi ................. 280/733
6,419,264 B1 * 7/2002 Tsuji et al. .................. 280/733

FOREIGN PATENT DOCUMENTS

| DE | 10 2004 006 843 A1 | 9/2005 |
| EP | 0 933 263 B1 | 8/1999 |
| JP | 11-165603 A | 6/1999 |
| JP | 11-255057 | 9/1999 |

* cited by examiner

*Primary Examiner*—D. Glenn Dayoan
*Assistant Examiner*—Timothy Wilhelm
(74) *Attorney, Agent, or Firm*—Foley & Lardner LLP (57) ABSTRACT

The disclosed air belt can protect a vehicle occupant in the event of an emergency. The disclosed air belt may include a folded back body formed by folding back a bag-shaped belt into a belt like shape and an extendable cover covering the folded back body. An inner surface of the cover can be bonded to an outer surface of the folded back body with a bonding agent. The bonding agent can be bonded in a scattered point-like manner.

12 Claims, 8 Drawing Sheets

AIR BELT APPARATUS

BACKGROUND

The present application relates to an air belt configured for a bag-shaped belt to be inflated by means of gas supplied from an inflator so as to keep an occupant of a motor vehicle under restraint when the motor vehicle encounters a car crash or the like, and an air belt apparatus using the same. More specifically, the present invention relates to an air belt and an air belt apparatus in which a folded back body of the bag-shaped belt is surrounded by a cover, and in which the folded back body and the cover are bonded with a bonding agent.

A conventional air belt apparatus is described in Japanese Unexamined Patent Application Publication No. 11-165603 and Japanese Unexamined Patent Application Publication No. 11-255057 (both of which are incorporated by reference herein).

These air belts, which include an extendable cover and a folded back body, are characterized in that an inner surface of the cover is bonded with an outer surface of the folded back body. The folded back body is formed by folding a bag-shaped belt, which is inflated by introducing gas, so as to have a belt-like shape. The extendable cover covers the folded back body of the bag-shaped belt.

In such an air belt, the outer surface of the folded back body and the inner surface of the cover are bonded. Thus, the cover cannot freely move relative to the folded back body.

In the Japanese Publication No. 11-165603, FIGS. 4(c) and 4(d) describe bonded portions that are spaced-apart and are disposed on the folded back body in a longitudinal direction in a manner of a line-like shape.

SUMMARY

A disclosed embodiment may provide an air belt capable of easily distributing a bonding agent composed of an adhesive agent or a cohesive compound in a manner such that the bonded part is uniform, and an air belt apparatus using the same.

An air belt can be characterized in that the air belt includes a folded back body and an expendable cover. The folded back body is formed by folding back a bag-shaped belt, which is inflated by gas introduced therein, into a belt like shape. The extendable cover covers the folded back body of the bag-shaped belt. The air belt can be configured so that an inner surface of the cover is bonded to an outer surface of the folded back body with a bonding agent, in which the bonding agent is bonded in a scattered point-like manner.

The air belt can be characterized in that each of the overlapped portions of the bag-shaped belt being folded back is bonded with the bonding agent.

The air belt can be characterized in that the bonding agent is bonded in the scattered point-like manner on an opposite face of each of the overlapped portions of the bag-shaped belt being folded back.

The air belt can be characterized in that a distribution density of the bonding agent is not uniform.

The air belt can be characterized in that an area in the bag-shaped belt being folded back is configured such that there is less distribution density of the bonding agent where there is more overlapped portions.

The air belt can be characterized in that the air belt is formed to be a belt-shaped folded back body by folding back for a plurality of times along folding back lines in a longitudinal direction thereof so that a width of the bag-shaped belt is decreased from a condition of being flatly extended. The distribution density of the bonding agent can be set such that the distribution density of the bonding agent becomes larger as either end side in the width direction of the bag-shaped belt in a flatly extended condition is approached.

The air belt can be characterized in that the bonding agent can have a bonding strength that releases when the folded back body is inflated.

The air belt apparatus may include an inflatable air belt and an inflator for inflating the air belt by supplying gas into the air belt.

In the air belt apparatus according to one disclosed embodiment, a folded back body of a bag-shaped belt is bonded onto a cover with a scattered point-like bonding agent. By providing the bonding agent in a scattered point-like manner, bonding portions can be uniformly distributed. Further, the bonding agent can be easily bonded using a roller or the like.

Further, by bonding each of overlapped portions of the folded back bag-shaped belt with the bonding agent, the shape of the folded back body can be maintained. The bonding agent can also be preferably provided in the scattered point-like manner. In this case, the distribution density of the bonding agent may be non uniform.

For example, in the folded back body of the bag-shaped belt, the distribution density of the bonding agent may be set such that the distribution density become less in an area where the number of overlapped portions increases. By such a construction, the area, where there is a relatively large number of overlapping portions, will be prevented from becoming excessively hard compared to an area where a relatively small number of overlapped portions overlap. As a result, it is possible that the hardness (or plasticity) of each of the portions of the air belt can be approximately uniform.

Further, in a case that the bag-shaped belt is formed to be a belt-shaped folded back body by folding back for a plurality of times along folding back lines thereof in a longitudinal direction such that the width is decreased from a flatly extended condition, the distribution density of the bonding agent may be increased such that the distribution density of the bonding agent becomes larger as both end sides in a width direction of the bag-shaped belt in the flatly extended condition are approached. In the thus configured case, when the bag-shaped belt is inflated, the bonding at the center of the width direction of the bag-shaped belt where the distribution density (i.e., bonding strength) of the bonding agent is relatively small is released first. Thus, the center of the width direction is inflated. Next, along with the rising of the internal pressure, the bonding is gradually released from the center of the width direction to both end sides in the width direction where the distribution density of the bonding agent is relatively large, and the thickness (capacity) of the bag-shaped belt is increased. Accordingly, it is possible to keep the internal pressure of the bag-shaped belt high in a relatively early stage.

When the bonding agent has a bonding strength that releases the bonding when inflating the folded back body, the inflation of the air belt becomes extremely smooth.

It is to be understood that both the foregoing general description and the following detailed description are exemplary and explanatory only, and are not restrictive of the invention as claimed.

BRIEF DESCRIPTION OF THE DRAWINGS

The features, aspects, and advantages of the present invention will become apparent from the following description, appended claims, and the accompanying exemplary embodiments shown in the drawings, which are briefly described below.

DETAILED DESCRIPTION

Various embodiments will now be explained with reference to the drawings.

Figure 1:
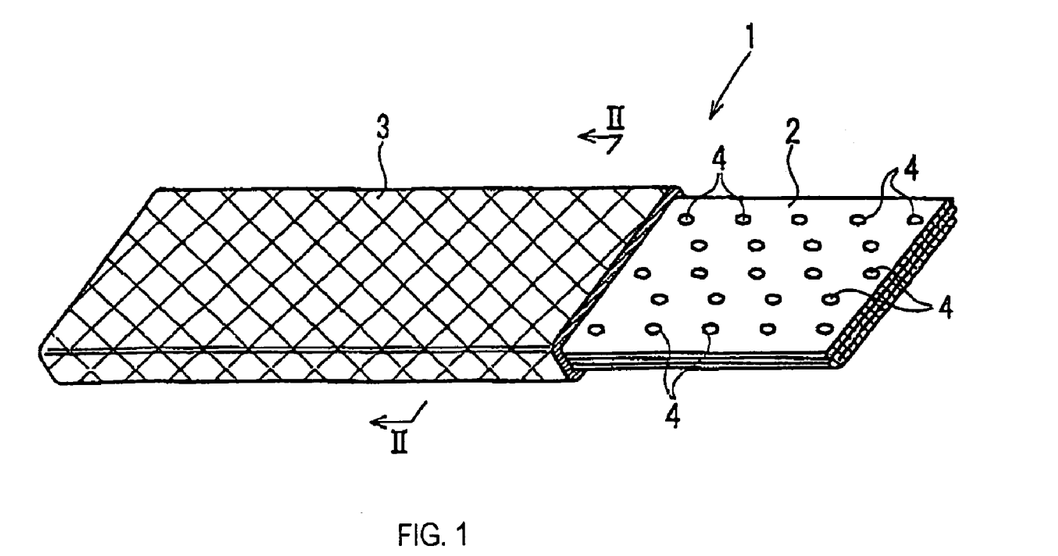
FIG. 1 is a perspective view illustrating an air belt.

As shown in FIG. 1, an air belt 1 can include a bag-shaped belt 2 that is folded back in an elongated belt-like shape, and a knit cover 3 serving as a cover that surrounds the folded back body of the bag-shaped belt 2. An outer surface of the folded back body and the knit cover 3 can be bonded with a bonding agent 4 composed of an adhesive agent or a cohesive compound. The bonding agent 4 may be provided in a scattered point-like manner. Further, a diameter of one point-like formed bonding agent 4 can preferably range from 2 to 20 mm, and more specifically, it may preferably range from about 5 to 10 mm. The distance between each of the closest point-like formed bonding agents 4 may preferably range from 10 to 50 mm, and more specifically, it may preferably range from about 10 to 30 mm.

Figure 2:
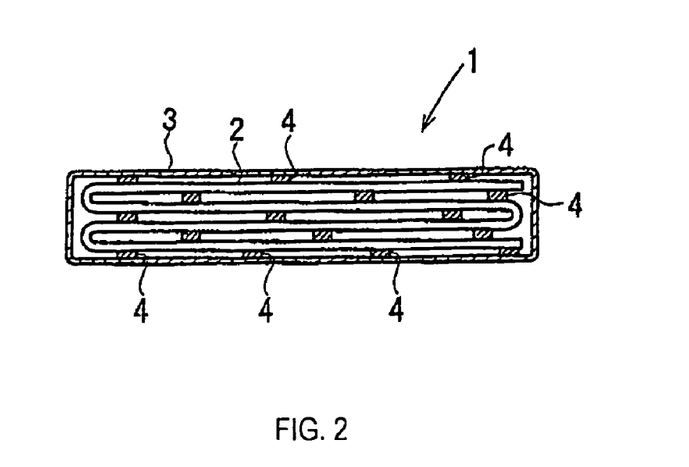
FIG. 2 is a cross-sectional view along the line II-II of FIG. 1.

In the embodiment of FIGS. 1-2, each portion of the bag-shaped belt 2 being overlapped together is bonded by the bonding agent 4 disposed in the scattered point-like manner in which the shape is maintained.

Although the knit cover 3 can flexibly expand and contract in the width direction, the knit cover 3 can hardly expand in the longitudinal direction because of a heating-and-stretching process performed during manufacture. Accordingly, when the diameter of the knit cover 3 is enlarged at a time of inflation of the air belt 1, the length of the air belt becomes shorter. Thus, the knit cover 3 applies a tensile load to the air belt 1.

Because the air belt 1 is formed by bonding the folded back body of the bag shaped belt 2 and the knit cover 3 with the bonding agent 4, there is no possibility that the knit cover 3 slides and moves along the surface of the folded back body. Thus, there is a good wearing and tactile sensation with the air belt 1. In the embodiment of FIGS. 1-2, the local sliding movement between the bag-shaped belt 2 and the knit cover 3 can further be prevented by increasing the distribution density of the scattered points. Thus, the wearing and tactile sensation with the air belt 1 can be remarkably good.

When the gas from an inflator is introduced into the bag-shaped belt 2 at a time of a car crash and the bag-shaped belt 2 is inflated, the bonding by the bonding agent 4 is released; the bag-shaped belt 2 is inflated; and the knit cover 3 is enlarged. At the time when the knit cover 3 is inflated, the length of the knit cover 3 in the longitudinal direction of the air belt 1 shortens. Thus, the air belt 1 fits close to an occupant and the air belt is now able to keep the occupant under restraint.

Incidentally, either one of an adhesive agent or a cohesive compound is applicable to be used as the bonding agent 4. In the case where the adhesive agent is used for the bonding agent 4, for example, a hot melt adhesive agent, a thermosetting adhesive agent, or the like, can be used. Upon bonding this kind of adhesive agent onto the bag-shaped belt 2, the folded back body can be kept in a folded back shape, i.e., the folded back shape is maintained, by heating the bag-shaped belt 2 after folding back the belt.

Further, the folded back body of the bag-shaped belt 2 and the knit cover 3 can be bonded by heating them after surrounding the folded back body, with the adhesive agent bonded on the outer surface thereof, with the knit cover 3.

For applying the bonding agent 4 onto the bag-shaped belt 2 in the scattered point-like manner, a roller having a pattern of scattered points may be rolled along the bag-shaped belt 2, or the bonding agent 4 may be supplied from above by a template having a pattern of scattered points after overlapping the template with the bag-shaped belt 2. As a matter of course, the bonding agent 4 may be bonded in the scattered point-like manner by any suitable means other than that described above.

Also, the bonding agent 4 may be bonded on a fabric for manufacturing the bag-shaped belt 2.

Figure 3:
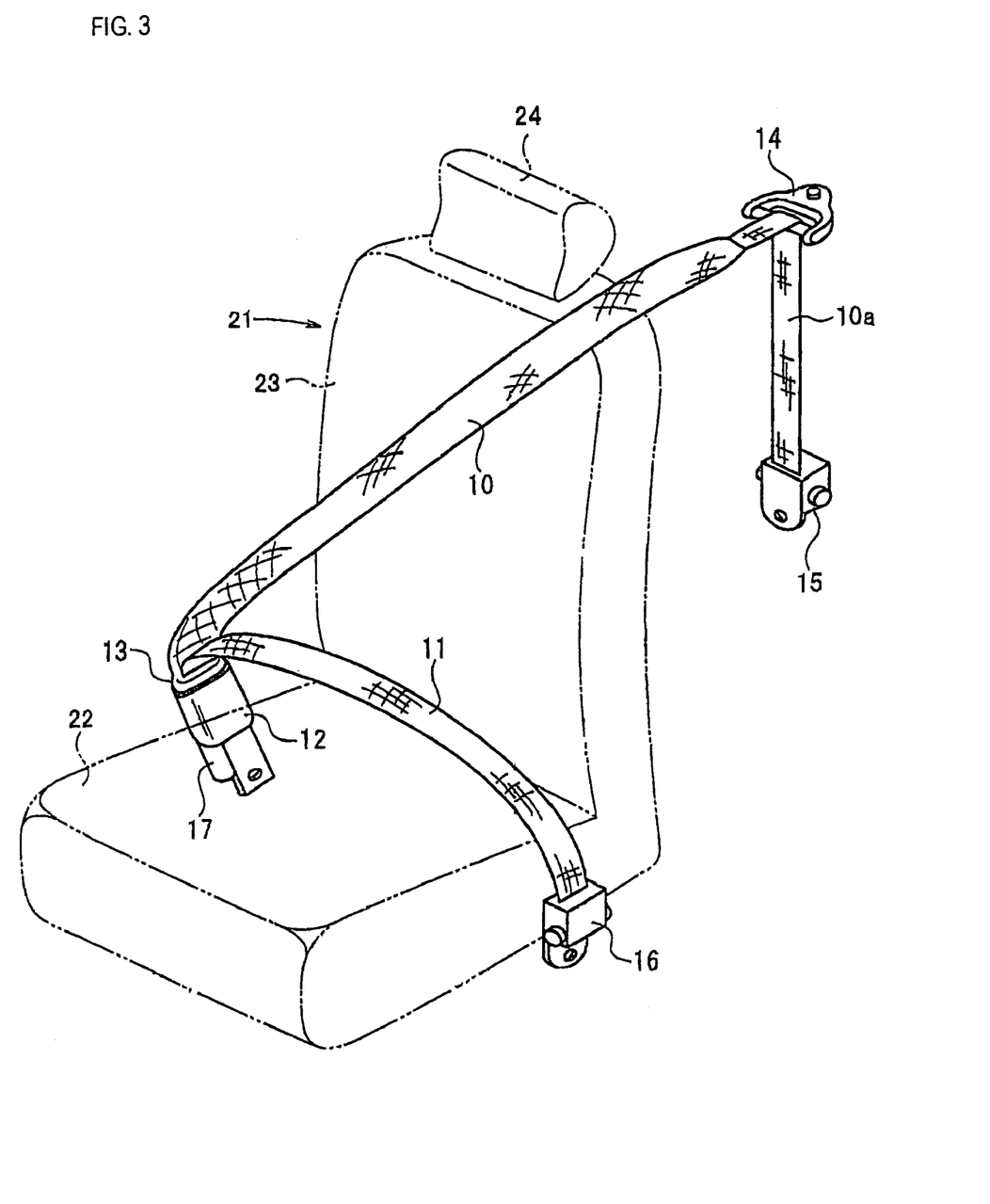
FIG. 3 is a perspective view showing an air belt apparatus.

FIG. 3 is a perspective view illustrating an inner part of a cabin of a motor vehicle provided with an air belt apparatus.

A seat 21 of the motor vehicle is provided with a seat cushion 22 in which the occupant seats, a seatback 23 constituting a backrest, and a head rest 24 provided at an upper part of the seatback 23.

In this embodiment, the air belt apparatus is provided with an inflatable shoulder belt portion 10, a webbing 10a connected to the shoulder belt portion 10, a lap belt portion 11, a buckle apparatus 12, a tongue 13, a shoulder anchor 14 for guiding the webbing 10a, retractors 15 and 16, and the like. The inflatable shoulder belt portion 10 can be diagonally pulled around a front surface side of an upper half of the body of the occupant sitting on the seat 21 (for example, from the upper left to the lower right as in the embodiment of FIG. 3). The lap belt portion 11 can be pulled around an upper side of the vicinity of a waist portion of the occupant in a horizontal direction. The buckle apparatus 12 can be provided adjacent to a lateral portion of the seat 21 (for example, the right side as in the embodiment of FIG. 3). The tongue 13 can be inserted into and hooked in the buckle apparatus 12 when the occupant wears the air belt 1.

In the embodiment of FIG. 3, the shoulder belt portion 10 can be constituted by the air belt 1.

The webbing 10a can be formed of a normal belt similar to the conventional general non-inflation-type seat belt, and can be slidably guided and allowed to pass through the shoulder anchor 14. An end portion of the webbing 10a may be retractably connected to a seat belt retractor (ELR) 15 having an emergency lock mechanism, which is provided below the shoulder anchor 14.

One end of the shoulder belt portion 10 is connected to a tip end of the webbing 10a by means of stitching or the like, and the other end thereof is connected to the tongue 13.

In this embodiment, the lap belt portion 11 can be formed of a normal belt similar to the general non-inflation-type seat belt. One end of the lap belt portion 11 may be connected to the tongue 13 and the other end of the lap belt portion 11 can be retractably connected to a seat belt retractor (ELR) 16 provided at the opposite side of the buckle apparatus 12 of the seat 21. However, at least a part of the lap belt portion 11 may be also constituted by the air belt 1.

In this embodiment, an inflator 17, which generates high-pressure gas by being activated at a necessary time for an emergency such as a car crash, is connected to the buckle apparatus 12. A nozzle (not shown) for introducing the gas from the inflator 17 to the shoulder belt portion 10 is provided in the tongue 13.

When the inflator 17 is activated at a time of a crash of the motor vehicle, an overturning of the motor vehicle, or the like, the gas is introduced into the shoulder belt portion 10 via the nozzle, and the shoulder belt portion 10 is inflated.

The aforementioned embodiment is merely exemplary, and the present invention can take a construction other than that described above. For example, although the shape of the folded back body of the bag-shaped belt 2 is maintained by means of the bonding agent in the aforementioned embodiment, the shape of the folded back body may be kept by means of a tear seam.

Figure 9:
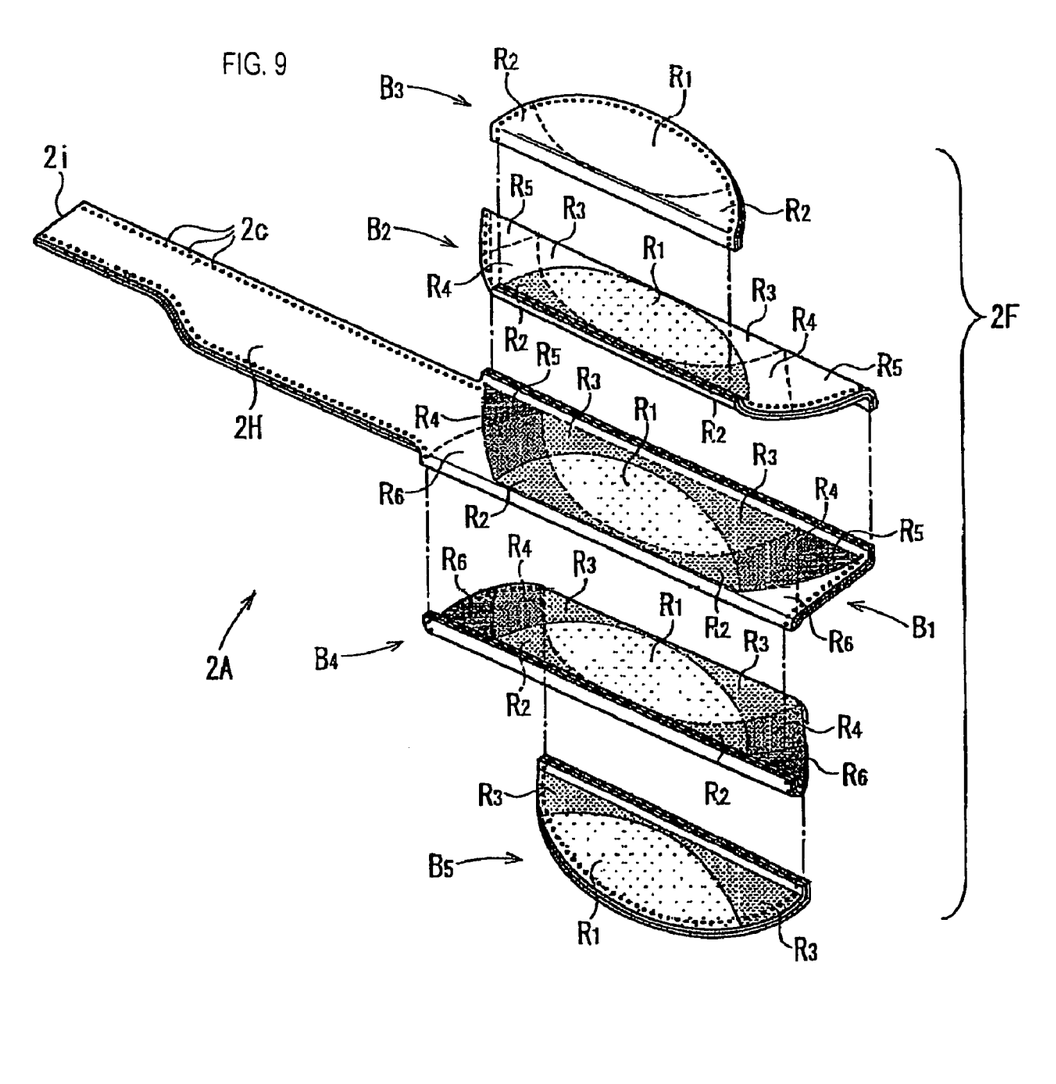
FIG. 9 is an exploded perspective view showing a distributing condition of a bonding agent for keeping the shape of the folded back body of the bag-shaped belt of FIGS. 8(a) and 8(b).
Figure 10:
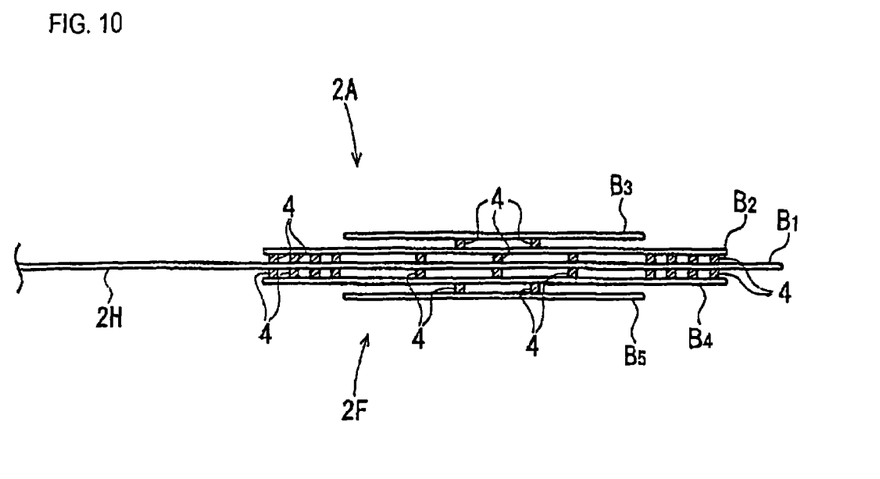
FIG. 10 is a cross-sectional view along the line X-X in FIG. 8(a).

FIGS. 4(a) through 8(b) are views explaining the folding back procedure of the bag-shaped belt 2A of the air belt according to another embodiment. Each of FIGS. 4(a), 5(a), 6(a), 7(a), and 8(a) are views illustrating the bag-shaped belt 2A, and FIGS. 4(b), 5(b), 6(b), 7(b), and 8(b) are views looking from a direction indicated by arrows, B and B, of each of FIGS. 4(a), 5(a), 6(a), 7(a), and 8(a), respectively. FIG. 9 is an exploded perspective view illustrating a distributing condition of the bonding agent for keeping the shape of the bag-shaped belt 2A. FIG. 10 is a cross-sectional view along the line X-X of FIG. 8(a).

Figure 4A:
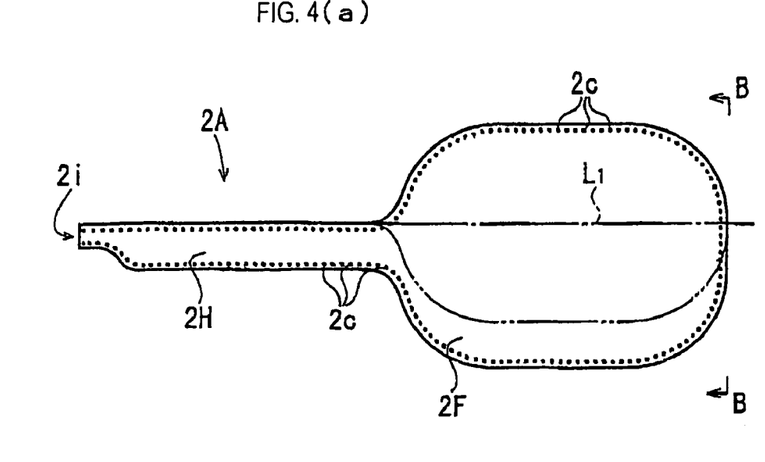
FIG. 4(a) and FIG. 4(b) show a first step in the folding back procedure of a bag-shaped belt.

As shown in FIG. 4(a), a bag-shaped belt 2A can be formed to have a relatively thin width from one end side in the longitudinal direction to a middle portion (hereinbelow, this portion is referred to as the thin width portion 2H). The width of the thin width portion 2H can be approximately uniform in the longitudinal direction. The bag-shaped belt also can be formed to have a width thicker than the thin width portion 2H, ranging from the middle portion to the other end side (hereinbelow, this portion is referred to as the thick width portion 2F). A gas introducing inlet 2i is provided at a tip end of the thin width portion 2H.

Further, this bag-shaped belt 2A is formed by overlapping two sheets of panels 2a and 2b that respectively constitute each of the surfaces of the front surface side and the back surface side of the bag-shaped belt 2A, and stitching each of the peripheral edge portions thereof together into a bag shape. Reference numeral 2c indicates a stitching seam.

In the embodiment shown in FIG. 4(a), the thick width portion 2F is formed such that, in a condition that the bag-shaped belt 2A is flatly extended and each of the panels 2a and 2b are overlapped, one half side and the other half side in the width direction of the bag-shaped belt 2A extend from their respective side edges of the thin width portion 2H. The extending portion of the thick width portion 2F has a shape in which the length in a longitudinal direction of the thick width portion 2F becomes smaller as it extends farther from the side edge of the thin width portion 2H. Thus, the thick width portion 2F is formed to have a plane shape of approximately an ellipse or approximately rectangular shape having four round corners having a width thicker than that of the thin width portion 2H.

This bag-shaped belt 2A is folded back so as to have the thick width portion 2F have approximately the same thickness as that of the thin width portion 2H. The folding back procedure of the bag-shaped belt 2A will be explained.

Figure 4B:
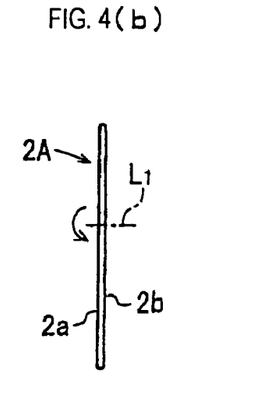
Figure 5A:
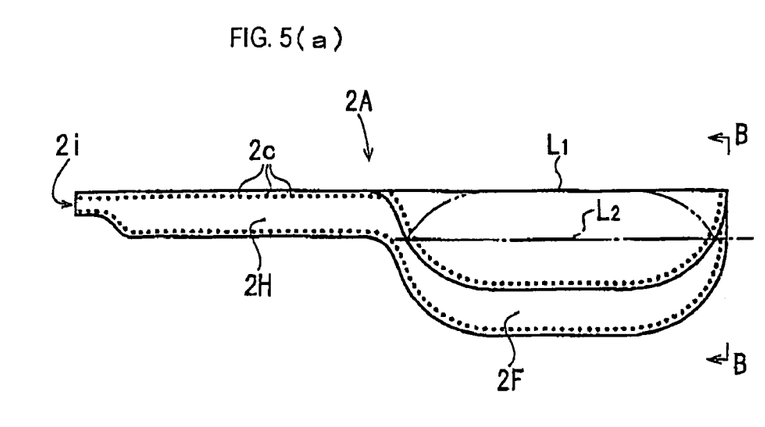
FIGS. 5(a) and 5(b) show a second step in the folding back procedure of the bag-shaped belt.
Figure 5B:
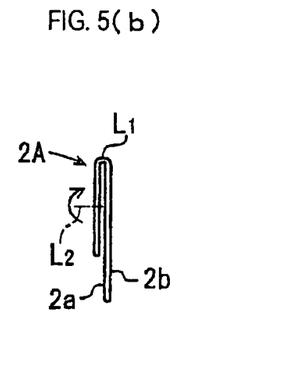
Figure 6A:
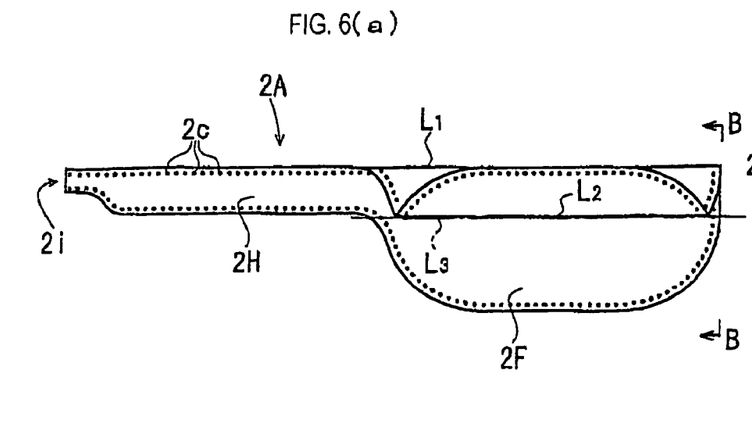
FIGS. 6(a) and 6(b) show a third step in the folding back procedure of the bag-shaped belt.
Figure 6B:
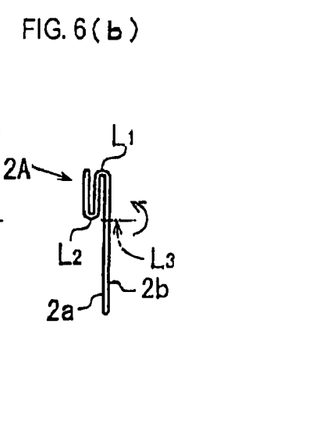
Figure 7A:
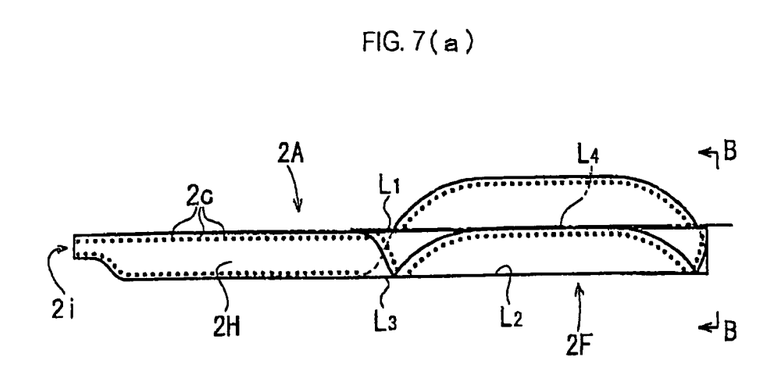
FIGS. 7(a) and 7(b) show a fourth step in the folding back procedure of the bag-shaped belt.
Figure 7B:
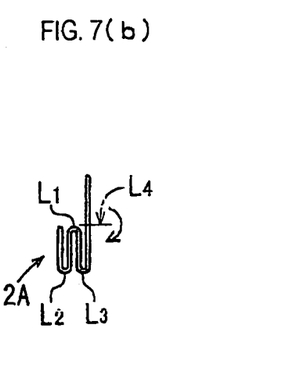

First, as shown in FIGS. 4(a) and 4(b), the bag-shaped belt 2A is flatly spread out so that each of the panels 2a and 2b can be overlapped. One half side in a width direction of the thick width portion 2F (a portion extending from a side edge of one side of the thin width potion 2H) is folded back to a front face side of the bag-shaped belt 2A along a folding back line L1. The folding back line L1 runs in the longitudinal direction and is approximately positioned on an extension line of a side edge of one side of the thin width portion 2H. Then, as shown in FIGS. 5(a) through 6(b), one half side of the thick width portion 2F is further folded back to the front side of the bag-shaped belt 2A along a folding back line L2. The folding back line L2 runs in the longitudinal direction and is approximately positioned on an extension line of the other side edge of the thin width portion 2H.

Further, the folding back operation for the one half side of the thick width portion 2F to the front face side of the bag-shaped belt 2A is repeated for a required number of times until the one half side of the thick width portion 2F does not protrude from either side edge of the thin width portion 2H, i.e., a zigzag folding.

Next, as shown in FIGS. 6(a) through 7(b), the other half side of the thick width portion 2F in the width direction (a portion extending from the other side edge of the thin width potion 2H) is folded back to a back face side of the bag-shaped belt 2A along a folding back line L3. The folding back line L3 runs in the longitudinal direction and is approximately positioned on an extension line of the side edge of the other side of the thin width portion 2H (a position to be approximately overlapped on the folding back line L2). Then, as shown in FIGS. 7(a) to 8(b), the other half side of the thick width portion 2F is further folded back to the back face side of the bag-shaped belt 2A along a folding back line L4. The folding back line L4 runs in the longitudinal direction and is approximately positioned on an extension line of the side edge of the one side of the thin width portion 2H (a position to be approximately overlapped on the folding back line L1).

Furthermore, the folding back operation for the other half side of the thick width portion 2F to the back face side of the bag-shaped belt 2A is also repeated for a required number of times until the other half side of the thick width portion 2F does not protrude from either side edge of the thin width portion 2H, i.e., a zigzag folding.

Figure 8A:
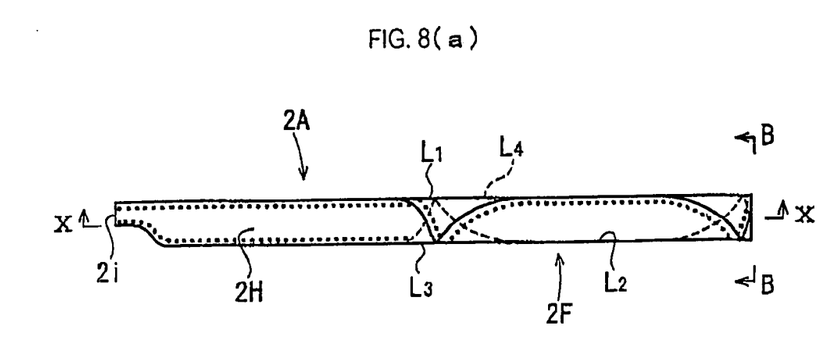
FIGS. 8(a) and 8(b) show a fifth step in the folding back procedure of the bag-shaped belt.
Figure 8B:
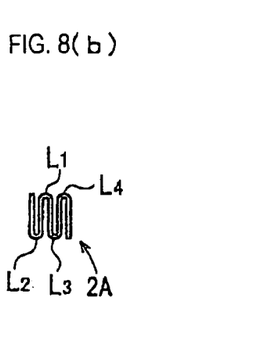

Thus, the bag-shaped belt 2A is formed to be a belt-shaped folded back body having an approximate uniform width for the entire length, as shown in FIGS. 8(a) and 8(b).

In the embodiment shown in FIGS. 8(a) and 8(b), the bonding agent 4 can also be provided in a scattered point-like manner in-between opposite faces of the thick width portion 2F which overlap each other, and each of the overlapped portions of the thick width portion 2F can be bonded by means of the bonding agent 4.

As shown in FIGS. 9 and 10, the distribution density of the scattered points of the bonding agent 4 becomes less in an area where there are more overlapping portions.

For example, the mark R1 in FIG. 9 denotes an area where a total of five portions are overlapped. These five portions include a center portion B1 (a portion between each of the folding lines L1 and L3) in the width direction of the thick width portion 2F; a portion B2 between each of the folding lines L1 and L2; a portion B3 from the folding back line L2 to an end portion of the one half side of the thick width portion 2F; a portion B4 between each of the folding back lines L3 and L4; and a portion B5 from the folding back line L4 to an end portion of the other half side of the thick width portion 2F. The mark R2 denotes an area where a total of the four portions, B1 through B4, are overlapped. The mark R3 denotes an area where a total of four portions, B1, B2, B4, and B5, are overlapped. The mark R4 denotes an area where a total of three portions, B1, B2, and B4, are overlapped. The mark R5 denotes an area where a total of two portions, B1 and B2, are overlapped. The mark R6 denotes an area where a total of two portions, B1 and B4, are overlapped.

In this embodiment, the distribution density of the scattered points of the bonding agent 4 is decreased in the order of the areas R5 and R6>the area R4>the areas R2 and R3>the area R1.

Also, in the embodiment of FIG. 9, the distribution density of the bonding agent 4 in each of the areas R1 through R6 is adjusted so that the hardness or plasticity of the folded back body of the bag-shaped belt 2A is configured to be approximately even in any one of the areas R1 through R6.

The air belt 1 is constituted by surrounding the folded back body of the bag-shaped belt 2A with an extendable cover, such as the above-described knit cover 3 or the like. Although not shown in this embodiment, an outer surface of the folded back body of the bag-shaped belt 2A and an inner surface of the cover are also bonded by the bonding agent 4, which is provided in the scattered point-like manner.

The air belt of FIG. 9 can also be used as the shoulder belt portion 10 of the air belt apparatus shown in FIG. 3. In this case, the gas introducing inlet 2i of the bag-shaped belt 2A is connected to the nozzle of the tongue 13. Other construction of this air belt apparatus can be the same as that of the embodiment shown in FIG. 3.

The air belt (for example, the shoulder belt 10) is worn in a manner so as to be diagonally pulled around a front surface side of the body of the occupant sitting on the seat similar to the case of a normal seat belt. In this case, the thick width portion 2F of the bag-shaped belt 2A is disposed in a sideward portion adjacent to the head portion of the occupant.

In the air belt of FIG. 9, the distribution density of the bonding agent 4 being disposed in a scattered point-like manner in which the bonding agent 4 bonds each of the overlapped portions of the folded back bodies of the bag-shaped belt 2A becomes smaller in an area where there are more overlapping portions. As a result, an area, where a relatively large number of portions overlap, is prevented from becoming excessively hard in comparison with an area where a relatively small number of portions overlap. Thus, the hardness or plasticity of each of the portions of the air belt is brought to be approximately even. Accordingly, the wearing sensation of the air belt is good.

Incidentally, the operation of the air belt apparatus provided with the air belt at the time of a car crash is similar to the embodiment of FIG. 3. However, in the embodiment of FIG. 9, because a portion of the bag-shaped belt 2A that is disposed at the side of the head portion of the occupant serves as the thick width portion 2F, which has a relatively large capacity, a shock applied to the head portion of the occupant can be fully absorbed by means of the thick width portion 2F in a case where the bag-shaped belt 2A is inflated.

Figures 11A, 11B, 11C:
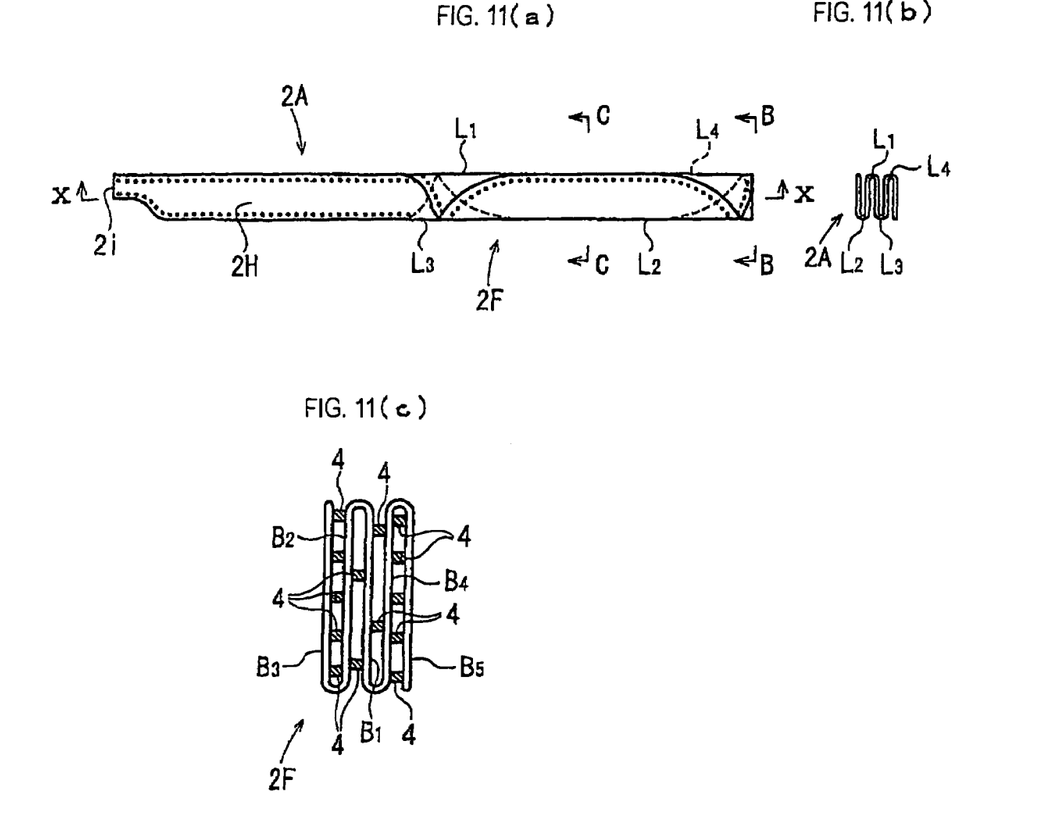
FIGS. 11(a), 11(b), and 11(c) are views of a folded back body of a bag-shaped belt according to another embodiment.
Figure 12:
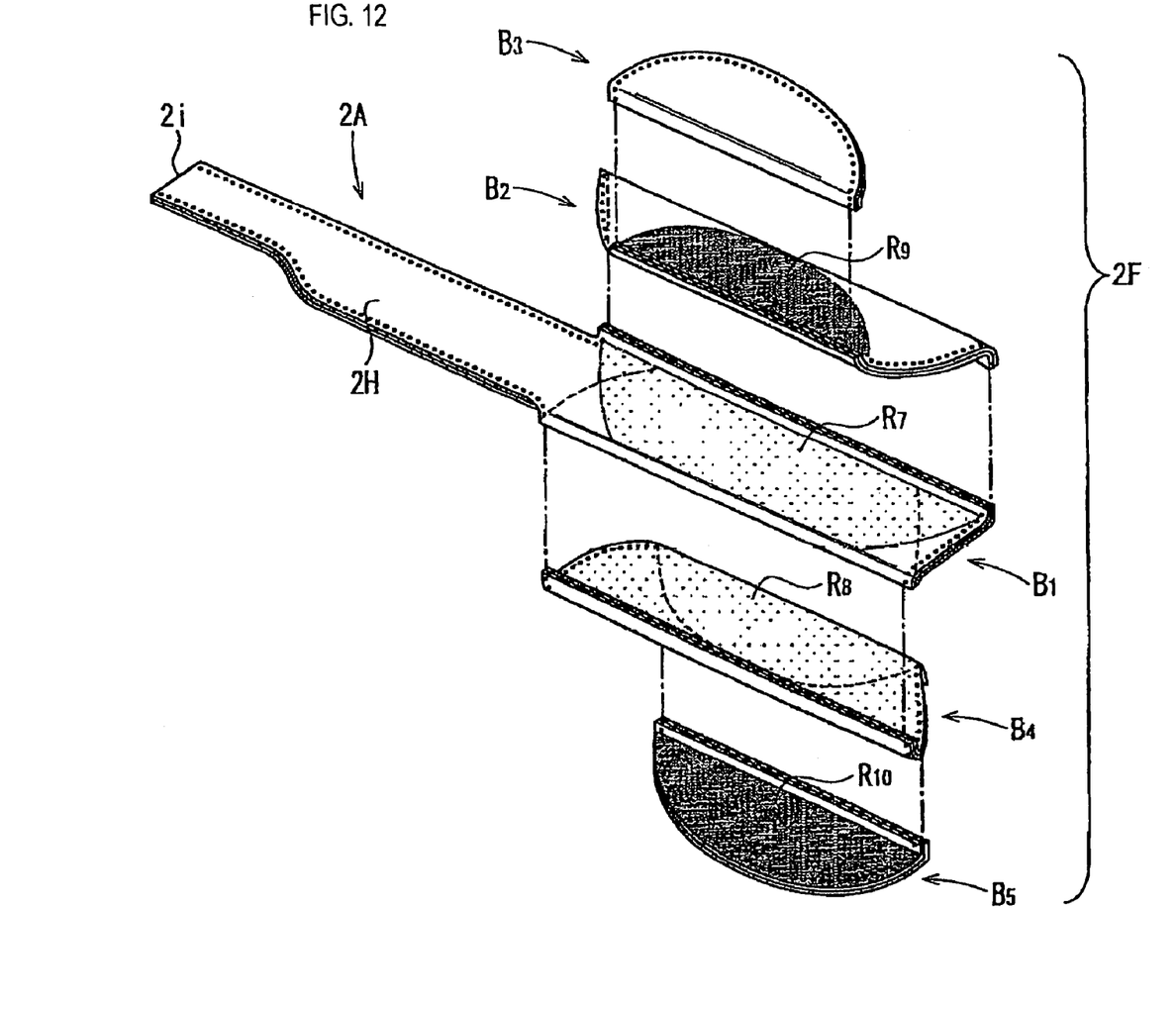
FIG. 12 is an exploded perspective view showing a distributing condition of a bonding agent for keeping the shape of the folded back body of the bag-shaped belt of FIGS. 11(a), 11(b), and 11(c).
Figure 13A:
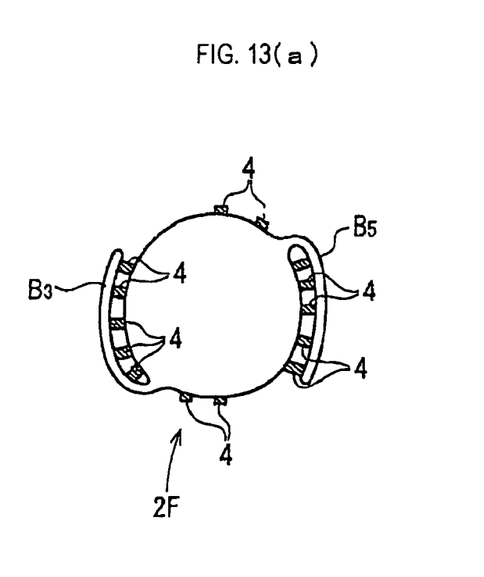
FIG. 13(a) is a cross-sectional view showing the bag-shaped belt of FIGS. 11(a), 11(b), and 11(c) during inflation.
Figure 13B:
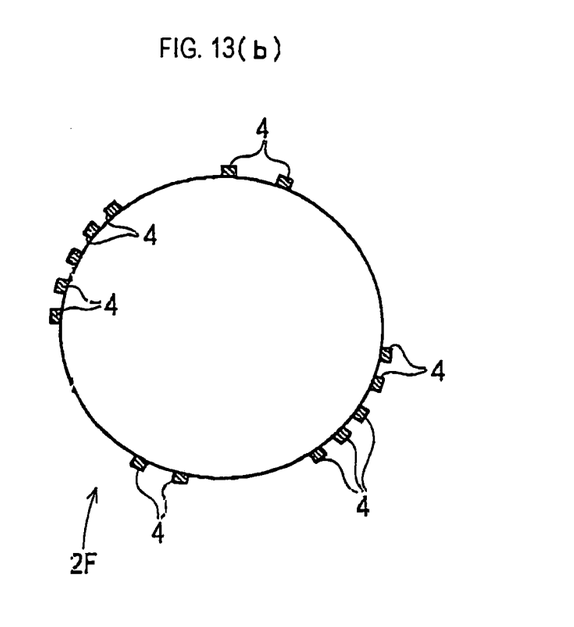
FIG. 13(b) is a cross-sectional view showing the bag-shaped belt of FIGS. 11(a), 11(b), and 11(c) when the inflation is complete.

FIG. 11(a) is a view of a folded back body of an air belt according to still another embodiment, FIG. 11(b) is a view looking from a direction indicated by arrows B and B in FIG. 11(a), and FIG. 11(c) is a cross-sectional, enlarged view along the line C-C in FIG. 11(a). FIG. 12 is a perspective view showing a distribution density of the bonding agent for keeping the shape of the folded back body of the bag-shaped belt. FIGS. 13(a) and 13(b) are cross-sections of the same portion as that in FIG. 11(c) illustrating the bag-shaped belt in the middle of inflation and upon completion of the inflation, respectively.

The bag-shaped belt 2A in FIGS. 11(a) through 13(b) can be the same as that in the embodiment illustrated in FIGS. 4(a) through 10. Also, the bag-shaped belt can be folded back using a similar folding back procedure as that previously described along the folding back lines L1 through L4 in the longitudinal direction such that the width of the thick width portion 2F is decreased. In this embodiment, each of the overlapped portions of the thick width portion 2F is also bonded by means of the bonding agent 4 provided in a scattered point-like manner at each of the opposite faces thereof.

In the thick width portion 2F, the distribution density of the bonding agent 4 at a facing area R9, where a portion B2 between each of the folding back lines L1 and L2 faces a portion B3 that goes from the folding back line L2 to an end portion of the one half side of the thick width portion 2F, is set to be larger than the distribution density of the bonding agent 4 at a facing area R7 between a center portion B1 (a portion between each of the folding back lines L1 and L3) and the portion B2. Further, the distribution density of the bonding agent 4 at a facing area R10, where a portion B4 between a center portion B1 and each of the folding back lines L3 and L4 faces a portion B5 that goes from the folding back line L4 to an end portion of the other half side of the thick width portion 2F, is set to be larger than the distribution density of the bonding agent 4 at a facing area R8 between the center portion B1 and the portion B4.

Furthermore, the distribution density of the bonding agent 4 at the areas R7 and R8 is set to be approximately the same. In addition, the distribution density of the bonding agent 4 at the areas R9 and R10 is set to be approximately the same.

In other words, the distribution density of the bonding agent 4 can be set such that the distribution density of the bonding agent 4 becomes larger when either end side is being approached from the center of the width direction of the thick width portion 2F.

The construction of this embodiment other than that described above is the same as that in the embodiment illustrated in FIGS. 4(a) through 10. The same numerals in FIGS. 11(a) through 13(b) as those in FIGS. 4(a) through 10 denote the same elements.

In the embodiment of FIG. 11, in the case that the bag-shaped belt 2A is inflated, as shown in FIG. 13(a), the bonding of each of the portions B1 and B2 and each of the portions B1 and B4 is released first because their distribution densities of the bonding agent 4 are relatively small and their bonding strengths of the bonding agent 4 are relatively small. Thus, the center of the width direction of the thick width portion 2F is inflated. Further, as the internal pressure of the bag-shaped belt 2A increases, the bonding of each of the portions B2 and B3 and each of the portions B4 and B5, whose distribution density of the bonding agent 4 is relatively large and the bonding strength of the bonding agent 4 is relatively large, are gradually released. Thus, the bag-shaped belt 2A can be eventually inflated to a maximum capacity, shown in FIG. 13(b).

Thus, by inflating in a manner so as to gradually increase the capacity from the center of the width direction of the thick width portion 2F to both end sides thereof, the internal pressure of the thick width portion 2F is kept high from a relatively early stage, and the thick width portion 2F is inflated earlier.

The above-described embodiments are illustrative of the invention and are not to be construed as limiting the invention.

For example, the folding back procedure of the bag-shaped belt is not limited to the folding back procedure of the above-described embodiments, and the bag-shaped belt may be folded back by means of a procedure other than that described above (for example, a roll folding).

The priority application Japanese Patent Application No. 2005-278163, filed Sep. 26, 2005, is incorporated by reference herein.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air belt comprising:
a folded back body formed by folding back a bag-shaped belt into a belt like shape such that a plurality of areas with different numbers of overlapping layers is formed; and
an extendable cover covering the folded back body,
wherein an inner surface of the cover is bonded to an outer surface of the folded back body with a bonding agent, and
wherein the bonding agent is distributed in a scattered point-like manner with a non-uniform distribution density such that the distribution density of the bonding agent decreases as the number of overlapping layers in areas of the folded back body increases.

2. The air belt according to claim 1, wherein the bag-shaped belt comprises overlapped portions where overlapping layers are formed, and wherein each of the overlapped portions being folded back is bonded with the bonding agent.

3. The air belt according to claim 2, wherein the bonding agent is distributed in the scattered point-like manner on an opposite face of each of the overlapped portions being folded back.

4. The air belt according to claim 1, wherein the distribution density of the bonding agent is distributed along the folded back body such that a hardness or plasticity of the folded back body is approximately constant in a folded state.

5. The air belt according to claim 4, wherein the folded back body is folded back for a plurality of times along folding back lines in a longitudinal direction of the folded back body so that a width of the bag-shaped belt is decreased from a condition of being flatly extended.

6. The air belt according to claim 1, wherein the bonding agent has a bonding strength configured to be released when the folded back body is inflated.

7. An air belt apparatus comprising:
an inflatable air belt; and
an inflator for inflating the air belt by supplying gas into the air belt,
wherein the air belt comprises:
a folded back body formed by folding back a bag-shaped belt into a belt like shape such that a plurality of areas with different numbers of overlapping layers is formed; and
an extendable cover covering the folded back body,
wherein an inner surface of the cover is bonded to an outer surface of the folded back body with a bonding agent, and
wherein the bonding agent is distributed in a scattered point-like manner with a non-uniform distribution density such that the distribution density of the bonding agent decreases as the number of overlapping layers in areas of the folded back body increases.

8. The apparatus of claim 7, wherein the bag-shaped belt comprises overlapped portions where overlapping layers are formed, and wherein each of the overlapped portions being folded back is bonded with the bonding agent.

9. The apparatus of claim 8, wherein the bonding agent is distributed in the scattered point-like manner on an opposite face of each of the overlapped portions being folded back.

10. The apparatus of claim 8, wherein the distribution density of the bonding agent is distributed along the folded back body such that a hardness or plasticity of the folded back body is approximately constant in a folded state.

11. The apparatus of claim 10, wherein the folded back body is folded back for a plurality of times along folding back lines in a longitudinal direction of the folded back body so that a width of the bag-shaped belt is decreased from a condition of being flatly extended.

12. The apparatus of claim 7, wherein the bonding agent has a bonding strength configured to be released when the folded back body is inflated.

* * * * *